(12) United States Patent
Zhou et al.

(10) Patent No.: US 10,170,110 B2
(45) Date of Patent: Jan. 1, 2019

(54) SYSTEM AND METHOD FOR RANKING OF HYBRID SPEECH RECOGNITION RESULTS WITH NEURAL NETWORKS

(71) Applicant: Robert Bosch GmbH, Stuttgart (DE)

(72) Inventors: Zhengyu Zhou, Fremont, CA (US); Rami Botros, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 15/353,767

(22) Filed: Nov. 17, 2016

(65) Prior Publication Data
US 2018/0137857 A1    May 17, 2018

(51) Int. Cl.
| | | |
|---|---|---|
| *G10L 15/16* | (2006.01) | |
| *G10L 15/065* | (2013.01) | |
| *G10L 15/197* | (2013.01) | |
| *G10L 15/22* | (2006.01) | |
| *G10L 15/02* | (2006.01) | |
| *G10L 15/06* | (2013.01) | |
| *G10L 15/32* | (2013.01) | |
| G10L 15/08 | (2006.01) | |

(52) U.S. Cl.
CPC .............. *G10L 15/22* (2013.01); *G10L 15/02* (2013.01); *G10L 15/063* (2013.01); *G10L 15/16* (2013.01); *G10L 15/32* (2013.01); *G10L 2015/088* (2013.01); *G10L 2015/223* (2013.01)

(58) Field of Classification Search
CPC ...... G10L 15/16; G10L 15/065; G10L 15/197
USPC .................................... 704/9, 235, 236, 246
See application file for complete search history.

(56) References Cited

U.S. PATENT DOCUMENTS

| | | | |
|---|---|---|---|
| 9,153,231 B1 * | 10/2015 | Salvador ............... | G10L 15/065 |
| 9,520,127 B2 * | 12/2016 | Li ........................... | G10L 15/16 |
| 2012/0084086 A1 | 4/2012 | Gilbert et al. | |
| 2014/0201126 A1 * | 7/2014 | Zadeh ..................... | G06K 9/627 |
| | | | 706/52 |
| 2014/0229158 A1 * | 8/2014 | Zweig ...................... | G06N 3/04 |
| | | | 704/9 |
| 2014/0337032 A1 * | 11/2014 | Aleksic ................... | G10L 15/32 |
| | | | 704/257 |

(Continued)

OTHER PUBLICATIONS

Hinton et al., Deep Neural Networks for Acoustic Modeling in Speech Recognition, IEEE, 2012, pp. 82-97.*

(Continued)

*Primary Examiner* — Seong Ah A Shin
(74) *Attorney, Agent, or Firm* — Maginot Moore & Beck LLP

(57) ABSTRACT

A method for ranking candidate speech recognition results includes generating, with a controller, a plurality of feature vectors for the candidate speech recognition results, each feature vector including one or more of trigger pair features, a confidence score feature, and word-level features. The method further includes providing the plurality of feature vectors as inputs to a neural network, generating a plurality of ranking scores corresponding to the plurality of feature vectors for the plurality of candidate speech recognition results based on an output layer of the neural network, and operating the automated system using the candidate speech recognition result in the plurality of candidate speech recognition results corresponding to a highest ranking score in the plurality of ranking scores as input.

14 Claims, 5 Drawing Sheets

(56) References Cited

U.S. PATENT DOCUMENTS

| | | | |
|---|---|---|---|
| 2015/0221308 A1 | 8/2015 | Suzuki | |
| 2015/0332670 A1* | 11/2015 | Akbacak | G10L 15/063 |
| | | | 704/9 |
| 2016/0260428 A1* | 9/2016 | Matsuda | G06N 3/08 |
| 2016/0307565 A1* | 10/2016 | Liu | G06N 3/02 |
| 2016/0357728 A1* | 12/2016 | Bellegarda | G06F 17/275 |

OTHER PUBLICATIONS

Anusuya et al., "Speech Recognition by Machine: A Review", IJCSIS, 2009, pp. 181-205.*

Bengio et al., "Learning Long-Term Dependencies with Gradient Descent is Difficult", IEEE, 1994, pp. 157-166.*

Mikolov et al. "Recurrent neural network based language model." Eleventh Annual Conference of the International Speech Communication Association. 2010.*

Tan et al., "Cluster adaptive training for deep neural network based acoustic model." IEEE/ACM Transactions on Audio, Speech and Language Processing (TASLP) 24.3 (2016): 459-468.*

International Search Report corresponding to International Patent Application No. PCT/EP2017/079272 (4 pages).

Fiscus, Jonathan G, "A Post-Processing System to Yield Reduced Word Error Rates: Recognizer Output Voting Error Reduction (Rover)," Proceedings of IEEE Workshop on Automatic Speech Recognition and Understanding, 1997 (8 pages).

Krymolowski, Yuval et al., "Using Application Semantic Context for Understanding Distorted ASR Output," Proceedings of Afeka 2013: The 3rd Annual Afeka Speech Processing Conference, Jul. 2, 2013 (4 pages).

Lecun, Yann et al., "Gradient-Based Learning Applied to Document Recognition," Proceedings of the IEEE, 1998 (46 pages).

Lecun, Yann et al., "Deep Learning," Nature, vol. 521, pp. 436-444, May 2015 (9 pages).

Mohamed, Abdel-rahman et al., "Acoustic Modeling using Deep Belief Networks," IEEE Transactions on Audio, Speech, and Language Processing, vol. 20, 2012 (10 pages).

Sak, Hasim et al., "Long Short-Term Memory Recurrent Neural Network Architectures for Large Scale Acoustic Modeling," INTERSPEECH 2014, pp. 338-342, 2014 (5 pages).

Siohan, Olivier et al., "Multitask Learning and System Combination for Automatic Speech Recognition," 2015 IEEE Automatic Speech Recognition and Understanding Workshop, pp. 589-595, 2015 (7 pages).

Sundermeyer, Martin et al., "From Feedforward to Recurrent LSTM Neural Networks for Language Modeling," IEEE/ACM Transactions on Audio, Speech, and Language Processing, vol. 23, No. 3, pp. 517-529, 2015 (13 pages).

Rosenfeld, Ronald, "Adaptive Statistical Language Modeling: A Maximum Entropy Approach," PhD Thesis, 1994 (114 pages).

Jiang, Hui, "Confidence measures for speech recognition: A survey," Speech Communication, vol. 45, No. 4, pp. 455-470, 2005 (16 pages).

Irie, Kazuki et al, "Bag-of-Words Input for Long History Representation in Neural Network-based Language Models for Speech Recognition," INTERSPEECH 2015, pp. 2371-2375, 2015 (5 pages).

He, Xiaodong et al., "Deep Learning for Natural Language Processing: Theory and Practice," Tutorial presented at 23rd ACM International Conference on Information and Knowledge Management (CIKM), 2014 (149 pages).

Hinton, Geoffrey et al., "Distilling the Knowledge in a Neural Network," Cornell University Library, arXiv:1503.02531, 2015, https://arxiv.org/abs/1503.02531v1 (9 pages).

Bengio, Yoshua et al., "Neural Probabilistic Language Models," Innovations in Machine Learning, Studies in Fuzziness and Soft Computing, vol. 194, pp. 137-186, 2006 (50 pages).

Glorot, Xavier et al., "Deep Sparse Rectifier Neural Networks," in Proceedings of 14th International Conference on Artificial Intelligence and Statistics (AISTATS), pp. 315-323, 2011 (9 pages).

Ioffe, Sergey et al., "Batch Normalization: Accelerating Deep Network Training by Reducing Internal Covariate Shift," Cornell University Library, arXiv:1502.03167v3, 2015, https://arxiv.org/abs/1502.03167 (11 pages).

Kingma, Diederik et al., "Adam: A Method for Stochastic Optimization," Cornell University Library, arXiv:1412.6980, 2014, https://arxiv.org/abs/1412.6980 (15 pages).

Bottou, Leon, "Large-Scale Machine Learning with Stochastic Gradient Descent," Proceedings of COMPSTAT 2010, 2010 (10 pages).

Glorot, Xavier et al., "Understanding the difficulty of training deep feedforward neural networks," in Proceedings of 13th International Conference on Artificial Intelligence and Statistics (AISTATS), vol. 9, pp. 249-256, 2010 (8 pages).

* cited by examiner

SYSTEM AND METHOD FOR RANKING OF HYBRID SPEECH RECOGNITION RESULTS WITH NEURAL NETWORKS

FIELD

This disclosure relates generally to the field of automated speech recognition and, more specifically, to systems and methods that improve the operation of speech recognition systems that utilize multiple speech recognition engines.

BACKGROUND

Automated speech recognition is an important technique to implement human machine interfaces (HMIs) in a wide range of applications. In particular, speech recognition is useful in situations where a human user needs to focus on performing a task where using traditional input devices such as a mouse and keyboard would be inconvenient or impractical. For example, in-vehicle "infotainment" systems, home automation systems, and many uses of small electronic mobile devices such as smartphones, tablets, and wearable computers can employ speech recognition to receive speech commands and other input from a user.

Most prior art speech recognition systems use a trained speech recognition engine to convert recorded spoken inputs from a user into digital data that is suitable for processing in a computerized system. Various speech engines that are known to the art perform natural language understanding techniques to recognize the words that the user speaks and to extract semantic meaning from the words to control the operation of a computerized system.

In some situations, a single speech recognition engine is not necessarily optimal for recognizing speech from a user while the user performs different tasks. Prior art solutions attempt to combine multiple speech recognition systems to improve the accuracy of speech recognition including selecting low-level outputs from the acoustic models different speech recognition models or selecting entire sets of outputs from different speech recognition engines based on a predetermined ranking process. However, the low-level combinations of outputs from multiple speech recognition systems do not preserve high-level linguistic information. In other embodiments, multiple speech recognition engines generate full speech recognition results, but the determination process of which speech recognition result to select in the outputs of multiple speech recognition engines is also a challenging problem. Consequently, improvements to speech recognition systems that improve the accuracy of selection of speech recognition results from a set of candidate speech recognition results from multiple speech recognition engines would be beneficial.

SUMMARY

In one embodiment, a method for performing speech recognition in an automated system has been developed. The method includes generating, with a controller, a plurality of feature vectors, each feature vector corresponding to one candidate speech recognition result in a plurality of candidate speech recognition results. The generating of a first feature vector in the plurality of feature vectors for a first candidate speech recognition result in the plurality of candidate speech recognition results further includes identifying, with the controller, at least one trigger pair including two predetermined trigger words within the first candidate speech recognition result with reference to a plurality of predetermined trigger pairs stored in a memory, and generating, with the controller, the first feature vector including an element for at least one trigger pair. The method further includes providing, with the controller, the plurality of feature vectors as inputs to a neural network, generating, with the controller a plurality of ranking scores corresponding to the plurality of feature vectors for the plurality of candidate speech recognition results based on an output layer of the neural network, and operating, with the controller, the automated system using the candidate speech recognition result in the plurality of candidate speech recognition results corresponding to a highest ranking score in the plurality of ranking scores as input.

In another embodiment, a method for training a neural network ranker that generates ranking scores for different candidate speech recognition results in an automated speech recognition system has been developed. The method includes generating, with a processor, a plurality of feature vectors, each feature vector corresponding to one training speech recognition result in a plurality of training speech recognition results stored in a memory. The generating of a first feature vector in the plurality of feature vectors for a first training speech recognition result in the plurality of training speech recognition results further includes identifying, with the processor, at least one trigger pair including two predetermined trigger words within the first training speech recognition result with reference to a plurality of predetermined trigger pairs stored in a memory, and generating, with the processor, the first feature vector including an element for the at least one trigger pair. The method further includes performing, with the processor, a training process for a neural network ranker using the plurality of feature vectors corresponding to the plurality of training speech recognition results as inputs to the neural network ranker, a plurality of output scores generated by the neural network ranker during the training process, and a plurality of target results based on predetermined edit distances between the plurality of training speech recognition results and predetermined correct inputs for each training speech recognition in the plurality of speech recognition results, and storing, with the processor, the neural network ranker in the memory after completion of the training process for use in generating ranking scores for additional feature vectors corresponding to speech recognition results that are not present in the plurality of training speech recognition results.

In another embodiment, an automated speech recognition system has been developed. The system includes a memory and a controller operatively connected to the memory. The memory is configured to store a plurality of predetermined trigger pairs, each trigger pair including two words; and a neural network configured to generate ranking scores corresponding to a plurality of candidate speech recognition results. The controller is configured to generate a plurality of feature vectors, each feature vector corresponding to one candidate speech recognition result in a plurality of candidate speech recognition results, the generation of a first feature vector in the plurality of feature vectors for a first candidate speech recognition result in the plurality of candidate speech recognition results. The controller is further configured to identify at least one trigger pair including two predetermined trigger words within the first candidate speech recognition result with reference to a plurality of predetermined trigger pairs stored in a memory, and generate the first feature vector including an element for the at least one trigger pair. The controller is further configured to provide the plurality of feature vectors as inputs to the neural network, generate a plurality of ranking scores corresponding to the plurality of feature vectors for the plurality of candidate speech recognition results based on an output layer of the neural network, and operate the automated system using the candidate speech recognition result in the plurality of candidate speech recognition results corresponding to a highest ranking score in the plurality of ranking scores as input.

DETAILED DESCRIPTION

Figure 1:
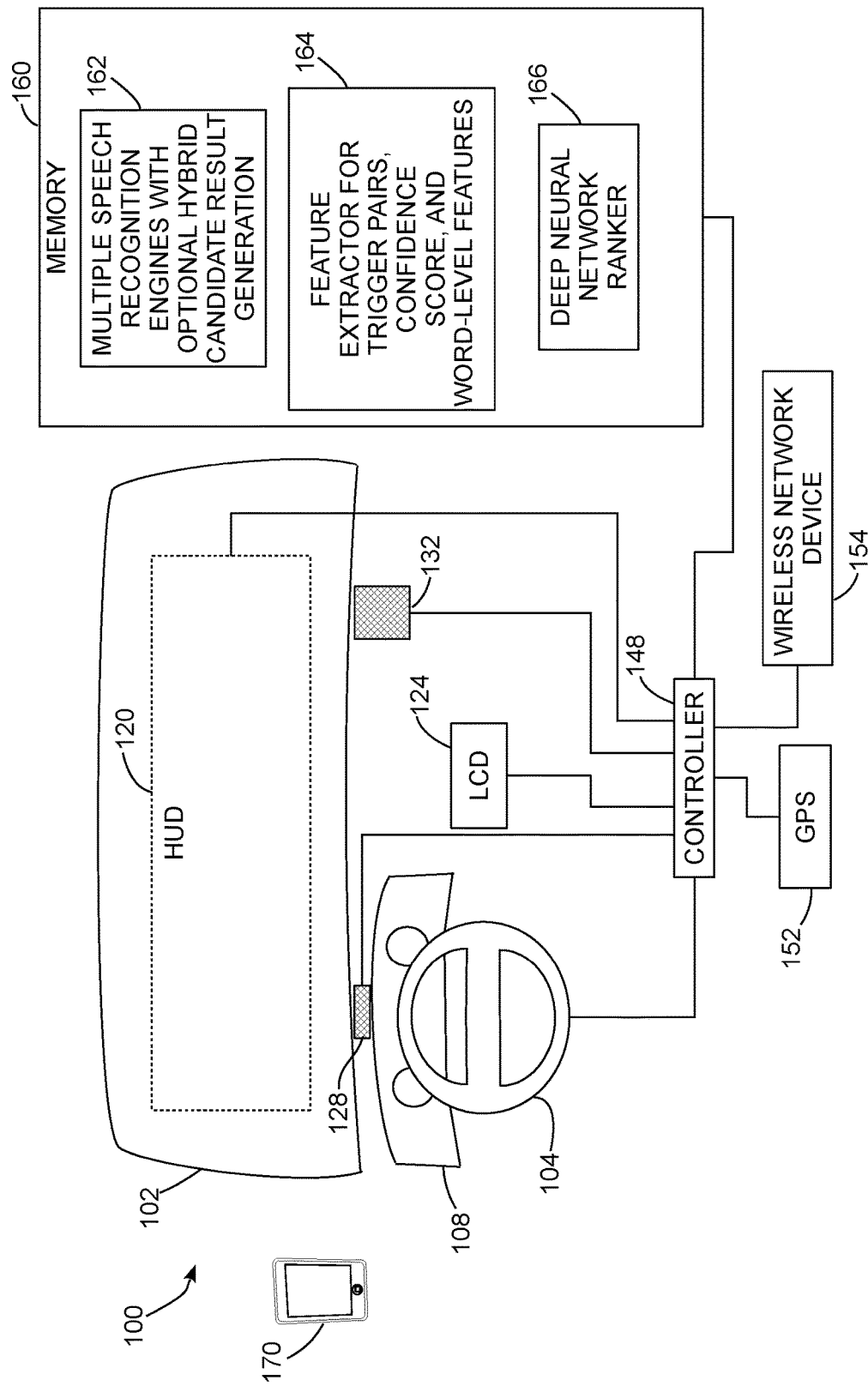
FIG. 1 is a schematic view of components of an automated system that receives speech input commands from a user as embodied in an in-vehicle information system in a passenger compartment of a vehicle.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "speech recognition engine" refers to a data model and executable program code that enable a computerized system to identify spoken words from an operator based on recorded audio input data of the spoken words that are received via a microphone or other audio input device. Speech recognition systems often include a lower-level acoustic model that recognizes the individual sounds of human speech in a sound recording and higher-level language models that recognize words and sentences based on sequences of the sounds from the acoustic model for a predetermined language. Speech recognition engines that are known to the art typically implement one or more statistical models such as, for example, a hidden Markov model (HMM), support vector machine (SVM), trained neural network, or another statistical model that generates statistical predictions for recorded human speech using a plurality of trained parameters that are applied to a feature vector of input data that corresponds to the human speech. The speech recognition engine generates the feature vector using, for example, various signal processing techniques that are known to the art that extract properties ("features") of the recorded speech signal and organize the features into a one-dimensional or multi-dimensional vector that can be processed using the statistical model to identify various parts of speech including individual words and sentences. Speech recognition engines can produce results for speech inputs corresponding to individual spoken phonemes and more complex patterns of sounds including spoken words and sentences that include sequences of related words.

As used herein, the term "speech recognition result" refers to a machine-readable output that the speech recognition engine generates for a given input. The result can be, for example, text encoded in a machine-readable format or another set of encoded data that serve as inputs to control the operation of an automated system. Due to the statistical nature of speech recognition engines, in some configurations the speech engine generates multiple potential speech recognition results for a single input. The speech engine also generates a "confidence score" for each speech recognition result, where the confidence score is a statistical estimate of the likelihood that each speech recognition result is accurate based on the trained statistical model of the speech recognition engine. As is described in more detail below, a hybrid speech recognition system uses speech recognition results that are produced by multiple speech recognition engines, generates additional hybrid speech recognition results, and finally produces at least one output speech recognition result based on the plurality of previously generated speech recognition results. As used herein, the term "candidate speech recognition result" or more simply "candidate result" refers to a speech recognition result that is a candidate to be the final speech recognition result from the hybrid speech recognition system that produces multiple candidate results and selects only a subset (typically one) of the results as the final speech recognition result. In various embodiments, candidate speech recognition results include both the speech recognition results from general-purpose and domain-specific speech recognition engines and hybrid speech recognition results that the system 100 generates using words from multiple candidate speech recognition results.

As used herein, the term "general-purpose speech recognition engine" refers to a type of speech recognition engine that is trained to recognize a broad range of speech from a natural human language such as English or Chinese. The general-purpose speech recognition engines generate speech recognition results based on a broad vocabulary of words and a language model that is trained to widely cover linguistic patterns in a natural language. As used herein, the term "domain-specific speech recognition engine" refers to a type of speech recognition engine that is trained to recognize speech inputs in a particular area of use or "domain" that often includes a somewhat different vocabulary and potentially different expected grammatical structures from broader natural languages. The vocabulary for a specific domain typically includes some terms from a broader natural language but may include a narrower overall vocabulary and in some instances includes specialized terms that are not officially recognized as official words in a natural language but are well-known to a particular domain. For example, in a navigation application a domain-specific speech recognition may recognize terms for roads, towns, or other geographic designations that are not typically recognized as proper names in a more general language. In other configurations, a particular domain uses a particular set of jargon that is useful for a particular domain but may not be well recognized in a broader language. For example, aviators officially use English as a language for communication but also employ a large number of domain-specific jargon words and other abbreviations that are not part of Standard English.

As used herein, the term "trigger pair" refers to two words, each of which can either be a word (e.g., "play") or a predetermined class (e.g., <Song Name>) representing a word sequence (e.g., "Poker Face") that falls within the predetermined class, such as the proper name of a song, person, location name, etc. Words in the trigger pair that, when appearing in a specific order within words in the sentence text content of a speech recognition result, have a high level of correlation between the appearance of a later word B in situations where an earlier word A is observed in audio input data for a trigger pair of A→B. As described in more detail below, after identification of a set of trigger pairs via a training process, the occurrences of trigger word pairs in the text of candidate speech recognition results forms a portion of a feature vector for each candidate result that a ranking process uses to rank different candidate speech recognition results.

Inference System and Ranking Process Using Trained Neural Network Ranker

FIG. 1 depicts an in-vehicle information system 100 that includes a head-up display (HUD) 120, one or more console LCD panels 124, one or more input microphones 128, and one or more output speakers 132. The LCD display 124 and HUD 120 generate visual output responses from the system 100 based, at least in part, upon speech input commands that the system 100 receives from an operator or other occupant of the vehicle. A controller 148 is operatively connected to each of the components in the in-vehicle information system 100. In some embodiments, the controller 148 connects to or incorporates additional components, such as a global positioning system (GPS) receiver 152 and wireless network device 154, to provide navigation and communication with external data networks and computing devices.

In some operating modes, the in-vehicle information system 100 operates independently, while in other operating modes, the in-vehicle information system 100 interacts with a mobile electronic device, such as a smartphone 170, tablet, notebook computer, or other electronic device. The in-vehicle information system communicates with the smartphone 170 using a wired interface, such as USB, or a wireless interface such as Bluetooth. The in-vehicle information system 100 provides a speech recognition user interface that enables the operator to control the smartphone 170 or another mobile electronic communication device using spoken commands that reduce distraction while operating the vehicle. For example, the in-vehicle information system 100 provides a speech interface to enable the vehicle operator to make phone calls or send text messages with the smartphone 170 without requiring the operator to hold or look at the smartphone 170. In some embodiments, the smartphone 170 includes various devices such as GPS and wireless networking devices that complement or replace the functionality of devices that housed in the vehicle.

The microphone 128 generates audio data from spoken input received from the vehicle operator or another vehicle passenger. The controller 148 includes hardware, such as DSPs, which process the audio data, and software components to convert the input signals from the microphone 128 into audio input data. As set forth below, the controller 148 uses at least one general-purpose and at least one domain-specific speech recognition engine to generate candidate speech recognition results based on the audio input data and the controller 148 further uses a ranker to improve the accuracy of the final speech recognition result output. Additionally, the controller 148 includes hardware and software components that enable generation of synthesized speech or other audio output through the speakers 132.

The in-vehicle information system 100 provides visual feedback to the vehicle operator using the LCD panel 124, the HUD 120 that is projected onto the windshield 102, and through gauges, indicator lights, or additional LCD panels that are located in the dashboard 108. When the vehicle is in motion, the controller 148 optionally deactivates the LCD panel 124 or only displays a simplified output through the LCD panel 124 to reduce distraction to the vehicle operator. The controller 148 displays visual feedback using the HUD 120 to enable the operator to view the environment around the vehicle while receiving visual feedback. The controller 148 typically displays simplified data on the HUD 120 in a region corresponding to the peripheral vision of the vehicle operator to ensure that the vehicle operator has an unobstructed view of the road and environment around the vehicle.

As described above, the HUD 120 displays visual information on a portion of the windshield 120. As used herein, the term "HUD" refers generically to a wide range of head-up display devices including, but not limited to, combined head up displays (CHUDs) that include a separate combiner element, and the like. In some embodiments, the HUD 120 displays monochromatic text and graphics, while other HUD embodiments include multi-color displays. While the HUD 120 is depicted as displaying on the windshield 102, in alternative embodiments a head up unit is integrated with glasses, a helmet visor, or a reticle that the operator wears during operation.

The controller 148 includes one or more integrated circuits configured as one or a combination of a central processing unit (CPU), graphical processing unit (GPU), microcontroller, field programmable gate array (FPGA), application specific integrated circuit (ASIC), digital signal processor (DSP), or any other suitable digital logic device. The controller 148 also includes a memory, such as a solid state or magnetic data storage device, that stores programmed instructions for operation of the in-vehicle information system 100.

During operation, the in-vehicle information system 100 receives input requests from multiple input devices, including speech input commands that are received through the microphone 128. In particular, the controller 148 receives audio input data corresponding to speech from a user via the microphone 128.

The controller 148 includes one or more integrated circuits configured as a central processing unit (CPU), microcontroller, field programmable gate array (FPGA), application specific integrated circuit (ASIC), digital signal processor (DSP), or any other suitable digital logic device. The controller 148 is also operatively connected to a memory 160, which includes a non-volatile solid state or magnetic data storage device and a volatile data storage device such as random access memory (RAM), which stores programmed instructions for operation of the in-vehicle information system 100. The memory 160 stores model data and executable program instruction code and data to implement multiple speech recognition engines 162, a feature extractor 164, and a deep neural network ranker 166. The speech recognition engines 162 are trained using a predetermined training process and the speech recognition engines 162 are otherwise known to the art. While the embodiment of FIG. 1 includes elements that are stored within the memory 160 of the system 100 within a motor vehicle, in some embodiments an external computing device, such as a network connected server, implements some or all of the features that are depicted in the system 100. Thus, those of skill in the art will recognize that any reference to the operation of the system 100 including the controller 148 and the memory 160 should further include the operations of server computing devices and other distributed computing components in alternative embodiments of the system 100.

In the embodiment of FIG. 1, the feature extractor 164 is configured to generate a feature vector with a plurality of numeric elements that correspond to the contents of each candidate speech recognition result, including the speech recognition results that are generated by one of the speech recognition engines 162 or hybrid speech recognition results that combine words from two or more of the speech recognition engines 162. The feature extractor 164 generates a feature vector including elements for any one or a combination of the following features: (a) trigger pairs, (b) confidence scores, and (c) individual word-level features including bag-of-words with decay features.

In the system 100, the trigger pairs that are stored in the feature extractor 164 each include a predetermined set of two words that have been previously identified as having a strong correlation in speech input sequences from a training corpus that represents the structure of expected speech inputs. A first trigger word has a strong statistical likelihood of being followed by a second trigger word in the trigger pair in speech input, although the words may be separated by an indeterminate number of intermediate words in different speech inputs. Thus, if a speech recognition result includes the trigger words, the likelihood of those trigger words in the speech recognition result being accurate is comparatively high due to the statistical correlation between the first and second trigger words. In the system 100, the trigger words are generated based on a mutual information score using statistical methods that are known to the art. The memory 160 stores a predetermined set of N trigger pair elements in the feature vector that correspond to trigger pairs with high correlation levels between the first word and the second word based on sets of trigger words with high mutual information scores. As described below, the trigger word pairs provide additional features of speech recognition results to the neural network ranker 166 that enables the neural network ranker 166 to rank the speech recognition results using additional features of the speech recognition results that go beyond the words that are present in the speech recognition result.

The confidence score features correspond to numeric confidence score values that the speech recognition engines 162 generate in conjunction with each candidate speech recognition result. For example, in one configuration a numeric value in the range of (0.0, 1.0) indicates a probabilistic confidence level that a speech recognition engine places in the accuracy of a particular candidate speech recognition result from lowest confidence (0.0) to highest confidence (1.0). Each of the hybrid candidate speech recognition results that include words from two or more speech recognition engines is assigned a confidence score that is a normalized average of the confidence scores of the candidate speech recognition results that the controller 148 uses to generate the hybrid speech recognition result in focus.

In the system 100, the controller 148 also normalizes and whitens confidence score values for speech recognition results that are generated by different speech recognition engines to generate the final feature vector elements including normalized and whitened confidence scores that are uniform between the outputs of the multiple speech recognition engines 162. The controller 148 normalizes the confidence scores from difference speech recognition engines using a normalization procedures, and then whitens the normalized confidence score values according to the mean and variance estimated on the training data using a prior-art whitening technique. In one embodiment, the controller 148 normalizes the confidence scores between different speech recognition engines using a linear regression process. The controller 148 first subdivides the confidence score ranges into a predetermined number of subdivisions or "bins", such as twenty unique bins for the two speech recognition engines A and B. The controller 148 then identifies the actual accuracy rates for various speech recognition results that correspond to each bin of scores based on the observed speech recognition results and the actual underlying inputs that were used during the training process prior to the process 200. The controller 148 performs a clustering operation of the confidence scores within predetermined numeric windows around "edges" that separate bins for each set of results from the different speech recognition engines and identifies an average accuracy score that corresponds to each edge confidence score value. The "edge" confidence scores are uniformly distributed along the confidence score range of each speech recognition engine and provide a predetermined number of comparison points to perform a linear regression that maps the confidence scores of a first speech recognition engine to confidence scores of another speech recognition engine that have similar accuracy rates.

The controller 148 uses the identified accuracy data for each edge score to perform a linear regression mapping that enables the controller 148 to convert a confidence score from a first speech recognition engine to another confidence score value that corresponds to an equivalent confidence score from a second speech recognition engine. The mapping of one confidence score from a first speech recognition engine to another confidence score from another speech recognition is also referred to as a score alignment process and in some embodiments the controller 148 determines an alignment of a confidence score from a first speech recognition engine with a second speech recognition engine using the following equation:

$$x' = e'_i + \frac{(x - e_i)}{(e_{i+1} - e_i)}(e'_{i+1} - e'_i)$$

Where x is the score from the first speech recognition engine, x' is the equivalent value of x within the confidence score range of the second speech recognition engine, the values $e_i$ and $e_{i+1}$ correspond to the estimated accuracy scores for different edge values that are nearest to the value x for the first speech recognition engine (e.g. the estimated accuracy scores for edge values 20 and 25 around a confidence score of 22) and the values $e_i'$ and $e_{i+1}'$ correspond to the estimated accuracy scores at the same relative edge values for the second speech recognition engine.

In some embodiments, the controller 148 stores the results of the linear regression in the feature extractor 164 within the memory 160 as a lookup table or other suitable data structure to enable efficient normalization of confidence scores between the different speech recognition engines 162 without having to regenerate the linear regression for each comparison.

The controller 148 also uses the feature extractor 164 to identify word-level features in the candidate speech recognition results. The word-level features correspond to data that the controller 148 places into elements of a feature vector that correspond to the characteristics of individual words within the candidate speech recognition results. In one embodiment, the controller 148 merely identifies the presence or absence of a plurality of predetermined in-vocabulary words that correspond to individual elements of a predetermined feature vector within each candidate speech recognition result. For example, if the word "street" occurs at least once in the candidate speech recognition result, then the controller 148 sets the value of the corresponding element in the feature vector as 1 during the feature extraction process. In another embodiment, the controller 148 identifies the frequency of each word, where "frequency" as used herein refers to the number of times that a single word occurs within a candidate speech recognition result. The controller 148 places the number of occurrences of the word in the corresponding element of the feature vector.

In still another embodiment, the feature extractor 164 generates a "bag-of-words with decay feature" for the element in the feature vector corresponding to each word in a predetermined vocabulary. The term "bag-of-words with decay" feature as used herein refers to a numeric score that the controller 148 assigns to each word in the predetermined vocabulary given a candidate speech recognition result based on the occurrence times and positions of the word within the result. The controller 148 generates the bag-of-words with decay score for each word in the candidate speech recognition result that is within the predetermined vocabulary, and assign the bag-of-words with decay score as zero for those in-vocabulary words that not occur in the candidate result. In some embodiments, the predetermined vocabulary includes a special entry to represent any out-of-vocabulary words, and the controller 148 also generates a single bag-of-words with decay score for the special entry based on all the out-of-vocabulary words within the candidate result. For a given word $w_i$ in a predetermined dictionary, the bag of words with decay score is: $bow_i = \Sigma_{p \in P'(w_i)} \gamma^p$ where $P'(w_i)$ is the set of positions in the candidate speech recognition result where the word $w_i$ occurs and the term $\gamma$ is a predetermined numeric decay factor in a range of (0, 1.0) that is, for example, set to 0.9 in the illustrative embodiment of the system 100.

Figure 5:
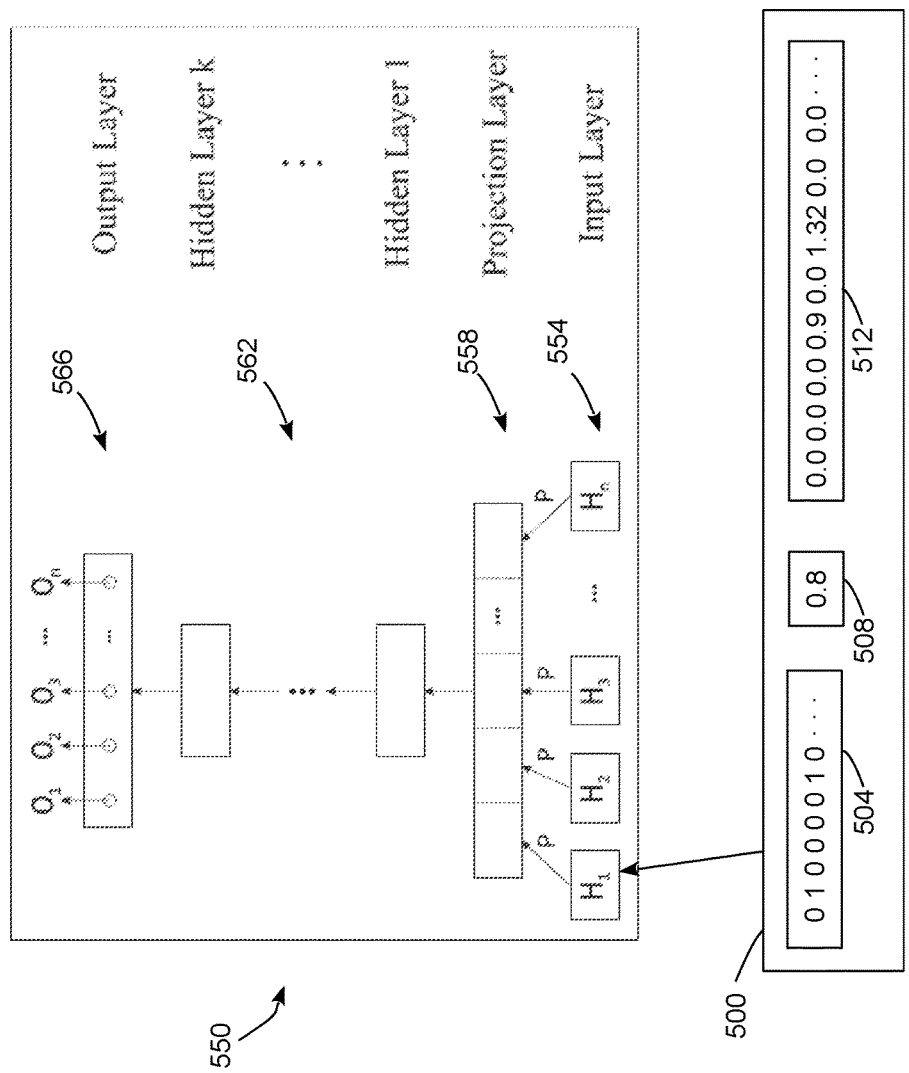
FIG. 5 is a diagram depicting the structure of a feature vector that is generated from a speech recognition result and the structure of a neural network ranker.

FIG. 5 depicts an example of the structure of a feature vector 500 in more detail. The feature vector 500 includes a plurality of elements corresponding to trigger pair features 504, a confidence score element 508, and another plurality of elements corresponding to the word-level features 512, which are depicted as bag-of-words with decay features in FIG. 5. In the feature vector 500, the trigger word pair features 504 include an element for each of the predetermined trigger pairs where a value of "0" indicates that the trigger pair is not present in the candidate speech recognition result and a value of "1" indicates that the trigger pair is present in the candidate speech recognition result. The confidence score element 508 is a single element that includes the numeric confidence score value that is generated by the corresponding speech recognition engine 162 or combination of speech recognition engines for hybrid speech recognition results. The word-level feature elements 512 include an array of elements that each correspond to a particular word in a predetermined vocabulary. For example, in one embodiment a predetermined dictionary for a language (e.g. English or Chinese) includes words that are each mapped to one of the word-level elements 512. In another embodiment that is described in more detail below, a training process generates a vocabulary of words based on the frequency of the occurrence of the words in a large set of training data, where the words that occur with the highest frequency (e.g. the 90% of words with the highest frequency) in the training data set map to the word level elements 512 in the structure of the feature vector 500.

The precise order of feature vector elements that is depicted in the feature vector 500 is not a requirement to represent the trigger pair, confidence score, and word-level features. Instead, any ordering of the elements in the feature vector 500 is valid as long as the feature vectors for all of the candidate speech recognition results are generated using a consistent structure where each element represents the same trigger pair, confidence score, or word-level feature amongst all of the candidate speech recognition results.

Referring again to FIG. 1, in the embodiment of FIG. 1, the neural network ranker 166 is a trained neural network including an input layer of neurons that receive a plurality of feature vectors corresponding to a predetermined number of candidate speech recognition results and an output layer of neurons that generate ranking scores corresponding to each of the input feature vectors. In general, neural networks include a plurality of nodes that are referred to as "neurons". Each neuron receives at least one input value, applies a predetermined weighting factor to the input value where different input values often receive different weighting factors, and generates an output as a sum of the weighted inputs with an optional bias factor added to the sum in some embodiments. The precise weighting factors for each input and the optional bias value in each neuron are generated during a training process that is described in more detail below. An output layer of the neural network includes another set of neurons that are specifically configured with an "activation function" during a training process. The activation function is, for example, a sigmoid function or other threshold function that produces an output value based on the inputs from a final hidden layer of neurons in the neural network where the precise parameters of the sigmoid function or threshold values are generated during a training process of the neural network.

In the specific configuration of FIG. 1, the neural network ranker 166 is a feed-forward deep neural network, and FIG. 5 includes an illustrative depiction of a feed-forward deep neural network 550. As is known in the art, a feed-forward neural network includes layers of neurons that are connected in a single direction proceeding from an input layer (layer 554) to an output layer (layer 566) without any recurrence or "feedback" loops that connect neurons in one layer of the neural network to neurons in a previous layer of the neural network. A deep neural network includes at least one "hidden layer" (and typically more than one hidden layer) of neurons that are not exposed as either the input layer or the output layer. In the neural network 550, a plurality of k hidden layers of neurons 562 connect the input layer 554 to the output layer 566.

In the embodiment of the neural network 550, the input layer further includes a projection layer 558 that applies predetermined matrix transformations to selected sets of input feature vector elements, including two different projection matrices for the trigger pair elements 504 and the word-level feature elements 512 respectively. The projection layer 558 generates a simplified representation of the outputs of the input neurons in the input layer 554 because in most practical inputs, the feature vector elements for the trigger pairs 504 and the word-level features 512 are "sparse", which means that each candidate speech recognition result only includes a small number (if any) of the trigger pair terms and a small number of words in a large overall set of words (e.g. 10,000 words) that are encoded in the structure of the feature vector 500. The transformations in the projection layer 558 enable the remaining layers of the neural network 550 to include fewer neurons while still generating useful ranking scores for the feature vector inputs of the candidate speech recognition results. In one illustrative embodiment, the two projection matrices $P_f$ for trigger word pairs and $P_w$ for word-level features each project the corresponding input neurons into a smaller vector space with 200 elements each, which produces a projected layer of 401 neurons (one neuron being reserved for the confidence score feature) for each of the n input feature vectors in the neural network ranker 166.

While FIG. 5 depicts the neural network 550 with a total of n input slots for the feature vectors that correspond to n different candidate speech recognition results, the number of input neurons in the input layer 554 includes one neuron for each element in the feature vector for the candidate speech recognition result, or a total of $n(T+\lfloor 0.9V \rfloor +2)$ neurons where T is the number of predetermined trigger pairs that are identified in the candidate speech recognition results and V is the number of words that appear in the vocabulary of recognized words with the 0.9 coefficient representing the filtering of the training set to only include the 90% of words that occur with the highest frequency as is described above. The fixed-value 2 represents one input neuron for the confidence score value and another input neuron that acts as a catch-all input for any word-level features that do not correspond to the predetermined word-level elements of the input feature vector, such as any out-of-vocabulary words that are not expressly modeled in the neural network ranker 166. For example, the controller 148 generates the feature vector using the feature extractor 164 to produce a bag-of-words with decay score for any words in a candidate speech recognition result that do not align with an element in the predetermined structure of the feature vector. The element in the feature vector that corresponds to the out of vocabulary words enables the neural network ranker 166 to incorporate the presence of any words that are not included in a default vocabulary into the generation of the ranking score for any candidate speech recognition results that include the out of vocabulary words.

The output layer 566 includes fewer output neurons than the input layer 554. In particular, the output layer 566 includes n output neurons where each output neuron generates a numeric ranking score for a corresponding one of the n input feature vectors during an inference process, which in the specific configuration of the system 100 is a ranking process to generate ranking scores for the feature vectors that correspond to the multiple candidate speech recognition results. Some hardware embodiments of the controller 148 include one or more compute units in a GPU or other specific hardware acceleration components to perform the inference process in a time and power efficient manner. In other embodiments, the system 100 further includes additional digital logic processing hardware that is incorporated into a remote server that the controller 148 accesses using the wireless network device 154 and a data network. In some embodiments, the hardware in the remote server also implements a portion of the functionality for the plurality of speech recognition engines 162. The server includes additional processing hardware to perform all or a portion of the feature extraction and neural network inference processing to generate the feature vectors and the ranking scores of the plurality of candidate speech recognition results.

During operation, the system 100 receives audio input data using the microphone 128 and uses the multiple speech engines 162 to generate a plurality of candidate speech recognition results, including hybrid speech recognition results that include words selected from two or more of the candidate speech recognition results in some embodiments. The controller 148 extracts features from the candidate speech recognition results using the feature extractor 164 to generate the feature vectors from the candidate speech recognition results, and provides the feature vectors to the neural network ranker 166 to generate output scores for each feature vector. The controller 148 then identifies the feature vector and candidate speech recognition result that corresponds to the highest ranking score, and the controller 148 operates the automated system using the candidate speech recognition result in the plurality of candidate speech recognition results corresponding to a highest ranking score in the plurality of ranking scores as input.

Figure 2:
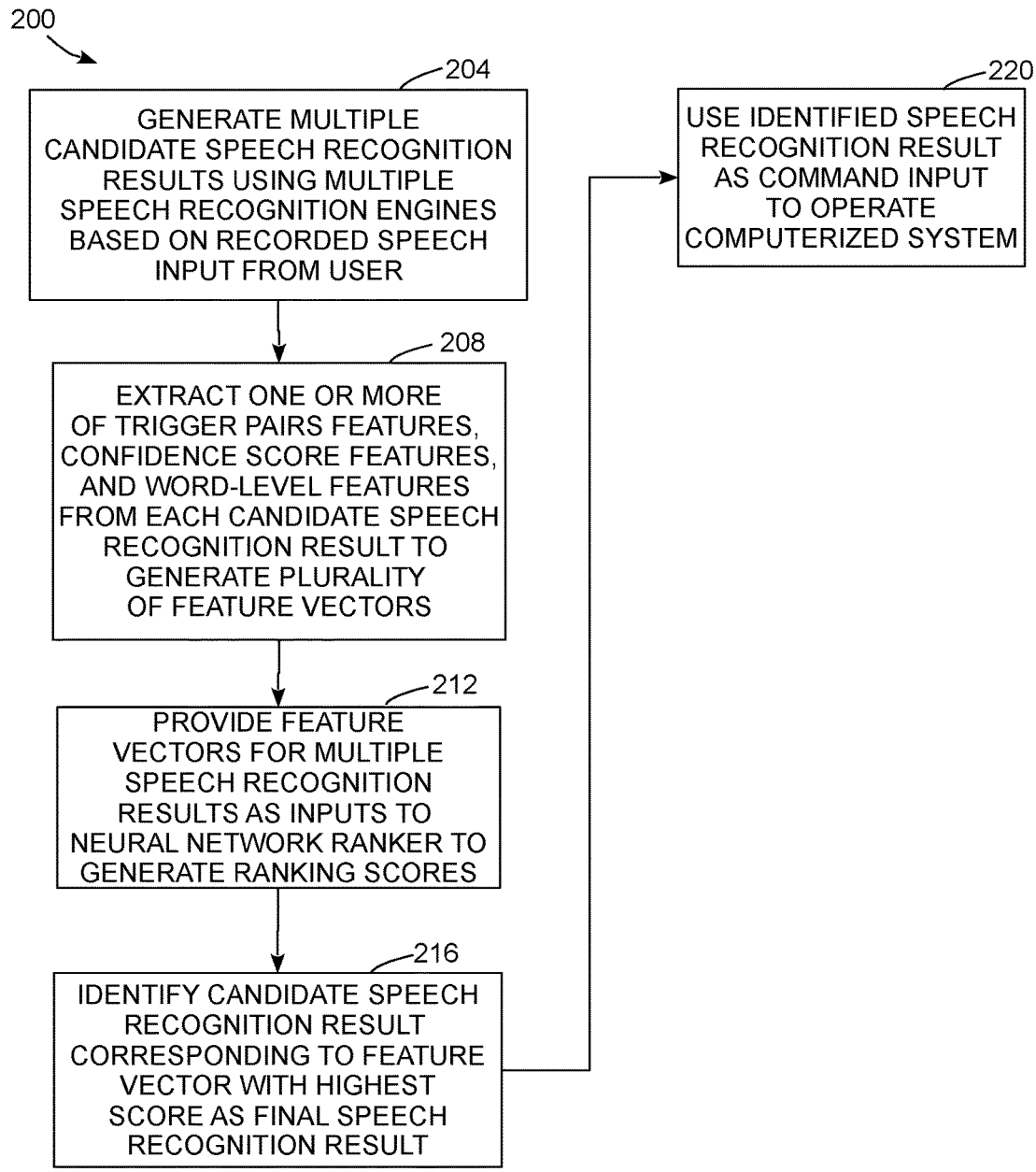
FIG. 2 is a block diagram of a process for using a neural network ranker to generate ranking scores for a plurality of candidate speech recognition results during a speech recognition process.

FIG. 2 depicts a process 200 for performing speech recognition using multiple speech recognition engines and a neural network ranker to select a candidate speech recognition result. In the description below, a reference to the process 200 performing a function or action refers to the operation of a controller to execute stored program instructions to perform the function or action in association with other components in the automated system. The process 200 is described in conjunction with the system 100 of FIG. 1 for illustrative purposes.

The process 200 begins as the system 100 generates multiple candidate speech recognition results using the multiple speech recognition engines 162 (block 204). In the system 100, a user provides spoken audio input to an audio input device, such as the microphone 128. The controller 148 uses the multiple speech recognition engines 162 to generate a plurality of candidate speech recognition results. As described above, in some embodiments the controller 148 generates hybrid candidate speech recognition results using selected words from the candidate speech recognition result of a domain-specific speech recognition engine to replace selected words in the candidate speech recognition result of a general-purpose speech recognition engine. The speech recognition engines 162 also generate confidence score data that the system 100 uses during feature vector generation in the process 200.

Process 200 continues as the system 100 performs feature extraction to generate a plurality of feature vectors that each correspond to one of the candidate speech recognition results (block 208). In the system 100, the controller 148 uses the feature extractor 164 to generate feature vectors that include one or more of the trigger pair, confidence score, and word-level features that are described above to generate a feature vector with the structure of the feature vector 500 in FIG. 5 or another similar structure for one or more of the rigger pair, confidence score, and word-level features. In the embodiment of FIG. 2, the controller 148 generates the word-level features using the bag-of-words with decay metric for the word-level feature elements of the feature vector.

The process 200 continues as the controller 148 provides the feature vectors for the plurality of candidate speech recognition results to the neural network ranker 166 as inputs in an inference process to generate a plurality of ranking scores corresponding to the plurality of candidate speech recognition results (block 212). In one embodiment, the controller 148 uses the trained feed-forward deep neural network ranker 166 to generate the plurality of ranking scores at the output layer neurons of the neural network using an inference process. As described above, in another embodiment the controller 148 transmits the feature vector data, candidate speech recognition results, or an encoded version of the recorded audio speech recognition data to an external server using the wireless network device 154 where a processor in the server performs a portion of the process 200 to generate the ranking scores of the candidate speech recognition results.

In most instances the controller 148 generates a number of candidate speech recognition results and corresponding feature vectors n that matches the predetermined number of n feature vector inputs for which the neural network ranker 166 is configured to receive during a training process. However, in some instances if the number of feature vectors for the candidate speech recognition results is less than the maximum number n, then the controller 148 generates "void" feature vector inputs with all zero values to ensure that all of the neurons in the input layer of the neural network ranker 166 receive an input. The controller 148 ignores the scores for the corresponding output layer neurons for each of the void inputs while the neural network in the ranker 166 produces scores for the non-void feature vectors of the candidate search recognition results.

The process 200 continues as the controller 148 identifies the candidate speech recognition result that corresponds to the highest ranking score in the output layer of the neural network ranker 166 (block 216). As described above in FIG. 5, each output neuron in the output layer 566 of the neural network 550 generate an output value corresponding to the ranking score of one of the input feature vectors that the system 100 provides to the predetermined sets of input neurons in the input layer 554. The controller 148 identifies the candidate speech recognition result with the highest ranking score based on the index of the output neuron that produces the highest ranking score within the neural network 550.

Referring again to FIG. 2, process 200 continues as the controller 148 uses the selected highest ranked speech recognition result as input from the user to operate the automated system (block 220). In the in-vehicle information system 100 of FIG. 1, the controller 148 operates various systems including, for example, a vehicle navigation system that uses the GPS 152, wireless network device 154, and LCD display 124 or HUD 120 to perform vehicle navigation operations in response to the speech input from the user. In another configuration, the controller 148 plays music through the audio output device 132 in response to the speech command. In still another configuration, the system 100 uses the smartphone 170 or another network connected device to place a hands-free phone call or transmit a text message based on the speech input from the user. While FIG. 1 depicts an in-vehicle information system embodiment, other embodiments employ automated systems that use the audio input data to control the operation of various hardware components and software applications.

While FIG. 1 depicts the in-vehicle information system 100 as an illustrative example of an automated system that performs speech recognition to receive and perform commands from a user, a similar speech recognition process can be implemented in other contexts. For example, a mobile electronic device such as the smartphone 170 or other suitable device typically includes one or more microphones and a processor that can implement the speech recognition engines, ranker, stored trigger pairs, and other components that implement a speech recognition and control system. In another embodiment, a home automation system controls HVAC and appliances in a house using at least one computing device that receives the speech input from the user and performs speech recognition using the multiple speech recognition engines to control the operation of various automated systems in the house. In each embodiment, the system is optionally configured to use different sets of domain-specific speech recognition engines that are tailored for the specific applications and operations of different automated systems.

Training System and Process to Train Neural Network Ranker

Figure 3:
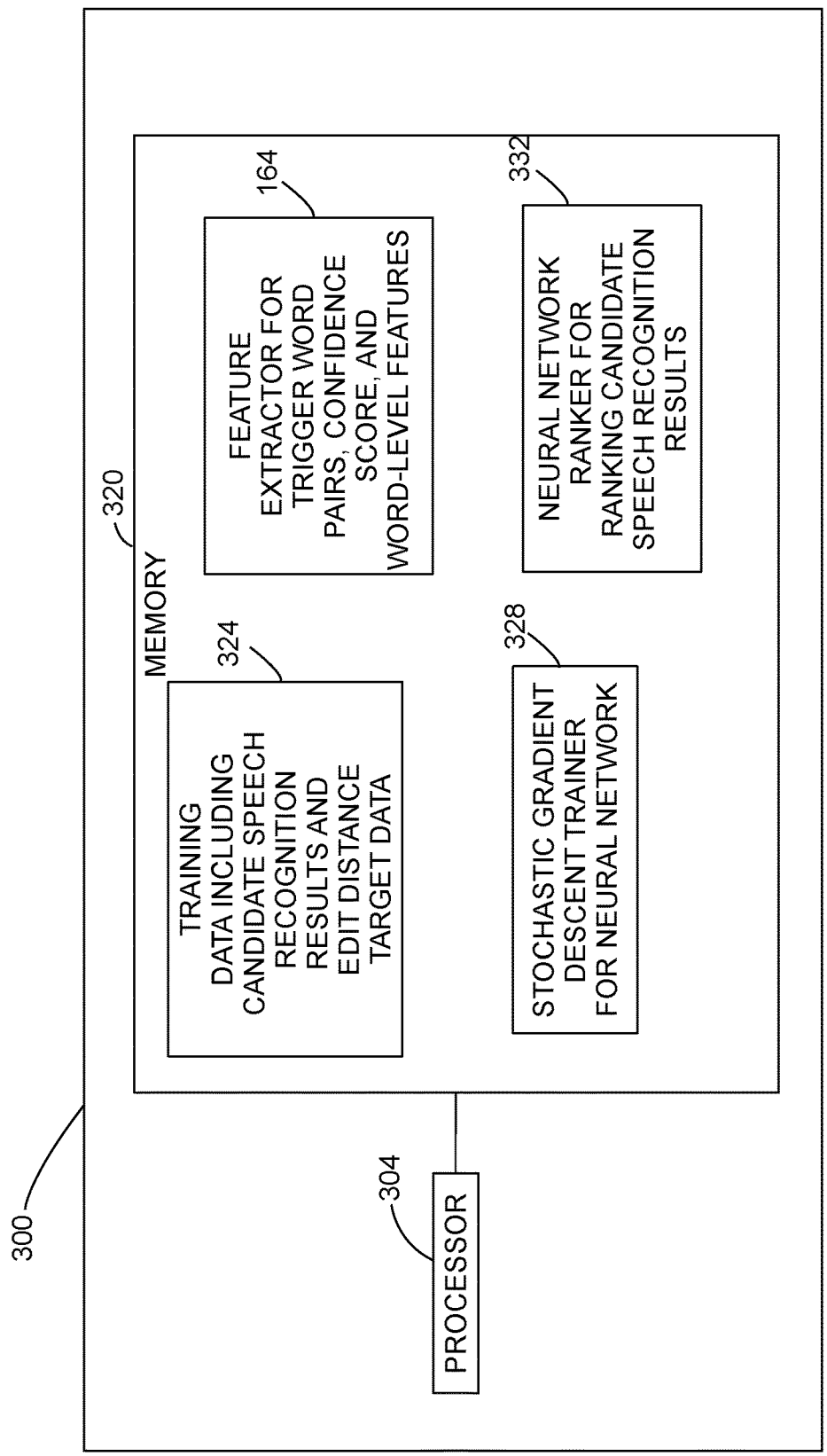
FIG. 3 is a schematic view of a computing system that performs a training process to generate the trained neural network ranker of FIG. 1 and FIG. 2.
Figure 4:
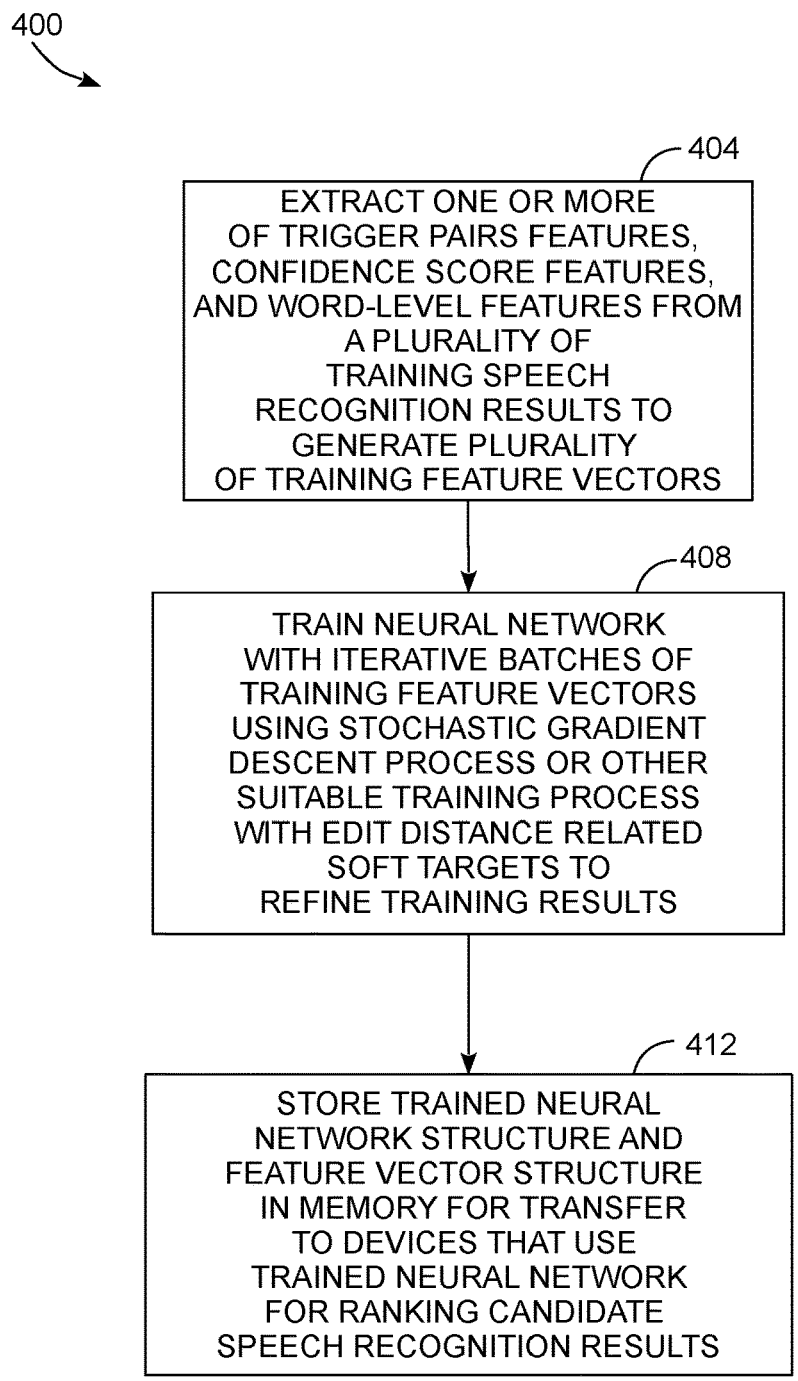
FIG. 4 is a block diagram of a process for generating a trained neural network ranker.

In the system 100 of FIG. 1 and the speech recognition process of FIG. 2, the neural network ranker 166 is a trained feed-forward deep neural network. The neural network ranker 166 is trained prior to the operation of the system 100 to perform the speech recognition process that is described above. FIG. 3 depicts an illustrative embodiment of a computerized system 300 that is configured to train the neural network ranker 166 and FIG. 4 depicts a training process 400 for generating the trained neural network ranker 166.

The system 300 includes a processor 304 and a memory 320. The processor 304 includes, for example, one or more CPU cores that are optionally connected to a parallelized hardware accelerator that is designed for training neural networks in a time and power efficient manner. Examples of such accelerators include, for example, GPUs with compute shader units that are configured for neural network training and specifically programmed FPGA chips or ASIC hardware that is dedicated to training of neural networks. In some embodiments the processor 304 further comprises a cluster of computing devices that operate in parallel to perform the neural network training process.

The memory 320 includes, for example, a non-volatile solid state or magnetic data storage device and a volatile data storage device such as random access memory (RAM), which stores programmed instructions for operation of the system 300. In the configuration of FIG. 3, the memory 320 stores data corresponding to training input data 324, a stochastic gradient descent trainer 328 for a neural network, a neural network ranker 332, and a feature extractor 164.

The training data 324 include, for example, a large set of speech recognition results that are produced by the same speech recognition engines 162 that are used in the system 100 for a large set of predetermined inputs, which optionally include hybrid speech recognition results. The training speech recognition result data also include the confidence scores for the training speech recognition results. For each speech recognition result, the training data also includes a Levenshtein distance metric that quantifies the differences between the speech recognition result and the predetermined ground-truth speech input training data, which represent the canonically "correct" results in the training process. The Levenshtein distance metric is one example of an "edit distance" metric since the metric quantifies the amount of changes (edits) that are necessary to transform the speech recognition result from the speech recognition engine into the actual input that was used for the training data. Both of the speech recognition result and the ground-truth speech input training data are referred to as "strings" of text in the comparison metric. For example, the edit distance quantifies the number of changes that are needed to convert a speech recognition result string "Sally shells sea sells by the seashore" to a corresponding correct ground-truth training data string "Sally sells sea shells by the seashore".

The Levenshtein distance metric is known to the art in other contexts and has several properties including: (1) the Levenshtein distance is always at least the difference of the sizes of the two strings; (2) the Levenshtein distance is at most the length of the longer string; (3) the Levenshtein distance is zero if and only if the strings are equal; (4) if the strings are the same size, the Hamming distance is an upper bound on the Levenshtein distance; and (4) the Levenshtein distance between two strings is no greater than the sum of their Levenshtein distances from a third string (triangle inequality). The Hamming distance, in turn, refers to a metric of the minimum number of substitutions required to change one string into the other, or the minimum number of errors that could have transformed one string into the other. While the system 300 includes training data that are encoded with the Levenshtein distance for illustrative purposes, in alternative embodiments another edit distance metric is used to describe the differences between the training speech recognition results and the corresponding ground-truth training inputs.

In the embodiment of FIG. 3, the feature extractor 164 in the memory 320 is the same feature extractor 164 that is used in the system 100 described above. In particular, the processor 304 uses the feature extractor 164 to generate a feature vector from each of the training speech recognition results using one or more of the trigger word pair, confidence score, and word-level features that are described above.

The stochastic gradient descent trainer 328 includes the stored program instructions and parameter data for a neural network training process that the processor 304 performs to train the neural network ranker 332 using feature vectors that the feature extractor 164 generates based on the training data 324. As is known to the art, stochastic gradient descent trainers include a class of related training processes that train a neural network in an iterative process by adjusting the parameters within the neural network to minimize the differences (errors) between the outputs of the neural network and a predetermined target function, which is also referred to as an "objective" function. While stochastic gradient descent training is generally known to the art and is not discussed in greater detail herein, the system 300 modifies the standard prior art training process. In particular, a training process seeks to generate outputs with a neural network using the training data as inputs that minimize the errors between the outputs of the neural network and the expected target results from the predetermined training data. In prior art training processes, the target values typically specify if a given output is a binary "correct" or "incorrect", such a target output from the neural network ranker that provides a score to indicate if the feature vector input for a training speech recognition result is either 100% correct or is not correct in some way when compared to the ground-truth input in the training data. However, in the system 300, the stochastic gradient descent trainer 328 uses the edit distance target data in the training data 324 as a "soft" target to more accurately reflect the level of correctness for different training speech recognition results, which may include a range of errors that affect the ranking score over a continuous range instead of merely being completely correct or incorrect.

The processor 304 uses the "soft" target data in the objective function to perform the training process using the stochastic gradient descent trainer 328. For example, the configuration of FIG. 3 uses a "softmax" objective function of the form:

$$\text{target}_i = \frac{e^{-d_i}}{\sum_{i=0}^{n} e^{-d_i}}$$

where di is the edit distance for a given training speech recognition result i. During the training process, the gradient descent trainer 328 performs a cost minimization process where the "cost" refers to the cross-entropy between the output values of the neural network ranker 332 during each iteration of the training process and the target values generated by the objective function. The processor 304 provides batches of samples to the gradient descent trainer 328 during the training process, such as a batch of 180 training inputs that each include different training speech recognition results that are generated by the multiple speech recognition engines. The iterative process continues until the cross-entropy of the training set has not improved over a course of ten iterations, and the trained neural network parameters that produce the lowest overall entropy from all of the training data form the final trained neural network.

During the training process the processor 304 shuffles the same input feature vectors between different sets of input neurons in the neural network ranker 332 during different iterations of the training process to ensure that the position of a particular feature vector in the input layer of the neural network does not produce an incorrect bias in the trained neural network. As is described above in the inference process, if a particular set of training data do not include a sufficient number of candidate speech recognition results to provide inputs to all of the neurons in the input layer of the neural network ranker 332, the processor 304 generates "void" input feature vectors with zero value inputs. As is known in the art, the stochastic gradient descent training process includes numeric training parameters and, in one configuration of the system 300, the hyperparameters of the stochastic gradient descent trainer 328 are $\alpha=0.001$, $\beta_1=0.9$ and $\beta_2=0.999$.

The neural network ranker 332 is, in one embodiment, a feed-forward deep neural network with the structure of the neural network 550 that is depicted in FIG. 5. During operation, the processor 304 generates the structure of an untrained neural network ranker 332 with a predetermined number of neurons based on the number of neurons in the input layer 554 of the neural network 550 in FIG. 5 and the number of output neurons in the output layer 566 for a total of n candidate speech recognition results that are each provided as inputs to the neural network to the inference process. The processor 304 also generates a suitable number of neurons in the k hidden layers 562 of the neural network 550. In one embodiment, the processor 304 initializes the neural network structure with randomized weight values for each input to the neurons. As described above, during the training process the processor 304 adjusts the various weight and bias values for the neurons within the input layer 554 and hidden layers 562 of the neural network along with the parameters of the activation function in the neurons of the output layer 566 to minimize the cross-entropy of the output from the neural network ranker 332 for a given set of inputs compared to the objective function.

While FIG. 3 depicts a specific configuration of a computerized device 300 that generates the trained neural network ranker, in some embodiments the same system that uses the trained neural network ranker in a speech recognition process is further configured to train the neural network ranker. For example, the controller 148 in the system 100 is an example of a processor that is configurable to perform the neural network training process in some embodiments.

FIG. 4 depicts a process 400 for performing speech recognition using multiple speech recognition engines and a neural network ranker to select a candidate speech recognition result. In the description below, a reference to the process 400 performing a function or action refers to the operation of a processor to execute stored program instructions to perform the function or action in association with other components in the automated system. The process 400 is described in conjunction with the system 300 of FIG. 3 for illustrative purposes.

The process 400 begins as the system 300 generates a plurality of feature vectors corresponding to the plurality of training speech recognition results stored in the training data 324 (block 404). In the system 300, the processor 304 uses the feature extractor 164 to generate the plurality of feature vectors where each feature vector corresponds to one training speech recognition result in the training data 324. As described above, the controller 304 generates each feature vector including one or more of the trigger pair features, the confidence score, and the word-level features including the bag-of-words with decay features in at least one embodiment of the process 400.

As part of the feature extraction and feature generation process, in some embodiments the controller 304 generates the structure of the feature vector including the specific elements that map to the trigger pair features and word-level features. For example, as described above in the system 100, in some embodiments the controller 304 generates the feature vector with a structure that corresponds to only a portion of the words that are observed in the training data 324, such as the 90% most commonly observed words while the remaining 10% of the words that occur with the lowest frequency are not encoded into the structure of the feature vector. The processor 304 optionally identifies the most common trigger pair features and generates the structure for the most commonly observe pairs of trigger words that are present in the training data 324. In an embodiment in which the system 300 generates the structure for the feature vector during the process 400, the processor 304 stores the structure of the feature vectors with the feature extractor data 164 and the structure of the feature vector along with the neural network ranker 332 after completion of the training process is provided to automated systems that use the feature vectors with the specified structure as inputs to the trained neural network to generate the ranking scores for the candidate speech recognition results. In other embodiments, the structure of the feature vectors is determined a priori based on a natural language such as English or Chinese instead of being based specifically upon the contents of the training data 324.

The process 400 continues as the system 300 trains the neural network ranker 332 based on the feature vectors of the training speech recognition results and the soft target edit distance data from the training data 324 using the stochastic gradient descent trainer 328 (block 408). During the training process, the processor 304 uses the plurality of feature vectors corresponding to the plurality of training speech recognition results as inputs to the neural network ranker and trains the neural network ranker 332 based on the cost minimization process between the plurality of output scores generated by the neural network ranker during the training process and the objective function with the soft scores described above based on the predetermined edit distances between the plurality of training speech recognition results and predetermined correct inputs for each training speech recognition in the plurality of speech recognition results. During the process 400, the processor 304 modifies the input weighting coefficients and neuron bias values in the input and hidden layers of the neural network ranker 332 and to adjust the parameters of the activation functions in the output layer of neurons in an iterative manner using the stochastic gradient descent trainer 328.

After the training process is completed, the processor 304 stores the structure of the trained neural network ranker 332 and optionally the structure of the feature vectors in embodiments where the feature vectors are generated based on the training data in the memory 320 (block 412). The stored structure of the neural network ranker 332 and the feature vector structure are subsequently transferred to other automated systems, such as the system 100 of FIG. 1, which use the trained neural network ranker 332 and the feature extractor 164 to rank multiple candidate speech recognition results during speech recognition operations.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method for speech recognition in an automated system comprising:
generating, with a controller, a plurality of feature vectors, each feature vector corresponding to one candidate speech recognition result in a plurality of candidate speech recognition results, the generating of a first feature vector in the plurality of feature vectors for a first candidate speech recognition result in the plurality of candidate speech recognition results further comprising:
identifying, with the controller, at least one trigger pair including two predetermined trigger words within the first candidate speech recognition result with reference to a plurality of predetermined trigger pairs stored in a memory;
identifying, with the controller, a plurality of unique words in the first candidate speech recognition result including a frequency that each unique word in the plurality of words occurs and at least one position of each unique word in the first candidate speech recognition result;
generating, with the controller a plurality of bag-of-words with decay parameters, each bag-of-words with decay parameter $bow_i$ being defined as $bow_i = \Sigma_{p \in P'(w_i)} \gamma^p$ corresponding to one unique word $w_i$ in the plurality of unique words based on the frequency and the at least one position of the one unique word $w_i$ in a set of positions $P'(w_i)$ where the one unique word $w_i$ occurs and a predetermined numeric decay factor $\gamma$; and
generating, with the controller, the first feature vector including an element for the at least one trigger pair and an element for each bag-of-words with decay parameter in the plurality of bag-of-words with decay parameters;
providing, with the controller, the plurality of feature vectors as inputs to a neural network stored in the memory;
generating, with the controller a plurality of ranking scores corresponding to the plurality of feature vectors for the plurality of candidate speech recognition results based on an output layer of the neural network; and
operating, with the controller, the automated system using the candidate speech recognition result in the plurality of candidate speech recognition results corresponding to a highest ranking score in the plurality of ranking scores as input.

2. The method of claim 1, the generating of each feature vector in the plurality of feature vectors further comprising:
generating, with the controller, each feature vector including an element for one confidence score in a plurality of confidence scores, each confidence score being associated with one candidate speech recognition result corresponding to each feature vector.

3. The method of claim 2 further comprising:
performing, with the controller, a linear regression process based on the plurality of confidence scores to generate a normalized plurality of confidence scores for the plurality of feature vectors, the normalized plurality of confidence scores being based on a confidence score of one predetermined candidate speech recognition result in the plurality of speech recognition results.

4. The method of claim 1, the providing of the plurality of feature vectors to the neural network further comprising:
providing, with the controller, the plurality of feature vectors as inputs to a feed-forward deep neural network stored in the memory.

5. The method of claim 1, further comprising:
generating, with an audio input device, audio input data corresponding to speech input from a user; and
generating, with the controller, the plurality of candidate speech recognition results corresponding to the audio input data using a plurality of speech recognition engines.

6. A method for training a neural network ranker comprising:
generating, with a processor, a plurality of feature vectors, each feature vector corresponding to one training speech recognition result in a plurality of training speech recognition results stored in a memory, the generating of a first feature vector in the plurality of feature vectors for a first training speech recognition result in the plurality of training speech recognition results further comprising:
identifying, with the processor, at least one trigger pair including two predetermined trigger words within the first training speech recognition result with reference to a plurality of predetermined trigger pairs stored in a memory;
identifying, with the processor, a plurality of unique words in the first training speech recognition result including a frequency that each unique word in the plurality of words occurs and at least one position of each unique word in the first training speech recognition result;
generating, with the processor a plurality of bag-of-words with decay parameters, each bag-of-words with decay parameter $bow_i$ being defined as $bow_i = \Sigma_{p \in P'(w_i)} \gamma^p$ corresponding to one unique word $w_i$ in the plurality of unique words based on the frequency and the at least one position of the one unique word $w_i$ in a set of positions $P'(w_i)$ where the one unique word $w_i$ occurs and a predetermined numeric decay factor $\gamma$; and
generating, with the processor, the first feature vector including an element for the at least one trigger pair and an element for each bag-of-words with decay parameter in the plurality of bag-of-words with decay parameters;
performing, with the processor, a training process for a neural network ranker using the plurality of feature vectors corresponding to the plurality of training speech recognition results as inputs to the neural network ranker, a plurality of output scores generated by the neural network ranker during the training process, and a plurality of target results based on predetermined edit distances between the plurality of training speech recognition results and predetermined correct inputs for each training speech recognition in the plurality of speech recognition results; and
storing, with the processor, the neural network ranker in the memory after completion of the training process for use in generating ranking scores for additional feature vectors corresponding to speech recognition results that are not present in the plurality of training speech recognition results.

7. The method of claim 6, the generating of the first feature vector further comprising:
generating, with the processor, the feature vector including an element for a confidence score associated with the first training speech recognition result.

8. The method of claim 6, the training process further comprising:
generating, with the processor, the trained neural network using a stochastic gradient descent training process.

9. The method of claim 6, the training further comprising:
performing, with the processor, the training process for the neural network ranker the plurality of target results based on Levenshtein distances between the plurality of training speech recognition results and predetermined correct inputs for each training speech recognition in the plurality of speech recognition results.

10. A system for automated speech recognition comprising:
a memory configured to store:
a plurality of predetermined trigger pairs, each trigger pair including two words; and
a neural network configured to generate ranking scores corresponding to a plurality of candidate speech recognition results; and
a controller operatively connected to the memory, the controller configured to:
generate a plurality of feature vectors, each feature vector corresponding to one candidate speech recognition result in a plurality of candidate speech recognition results, the generation of a first feature vector in the plurality of feature vectors for a first candidate speech recognition result in the plurality of candidate speech recognition results further including a further configuration of the controller to:
identify at least one trigger pair including two predetermined trigger words within the first candidate speech recognition result with reference to a plurality of predetermined trigger pairs stored in a memory;
identify a plurality of unique words in the first candidate speech recognition result including a frequency that each unique word in the plurality of words occurs and at least one position of each unique word in the first candidate speech recognition result;
generate a plurality of bag-of-words with decay parameters, each bag-of-words with decay parameter $bow_i$ being defined as $bow_i = \Sigma_{p \in P'(w_i)} \gamma^p$ corresponding to one unique word $w_i$ in the plurality of unique words based on the frequency and the at least one position of the one unique word $w_i$ in a set of positions $P'(w_i)$ where the one unique word $w_i$ occurs and a predetermined numeric decay factor $\gamma$; and
generate the first feature vector including an element for the at least one trigger pair and an element for each bag-of-words with decay parameter in the plurality of bag-of-words with decay parameters;

provide the plurality of feature vectors as inputs to the neural network;

generate a plurality of ranking scores corresponding to the plurality of feature vectors for the plurality of candidate speech recognition results based on an output layer of the neural network; and operate the automated system using the candidate speech recognition result in the plurality of candidate speech recognition results corresponding to a highest ranking score in the plurality of ranking scores as input.

11. The system of claim 10, the controller being further configured to:

generate each feature vector including an element for one confidence score in a plurality of confidence scores, each confidence score being associated with the one candidate speech recognition result corresponding to each feature vector.

12. The system of claim 11, the controller being further configured to:

perform a linear regression process based on the plurality of confidence scores to generate a normalized plurality of confidence scores for the plurality of feature vectors, the normalized plurality of confidence scores being based on a confidence score of one predetermined candidate speech recognition result in the plurality of speech recognition results.

13. The system of claim 10, wherein the neural network in the memory is a feed-forward deep neural network, the controller being further configured to:

provide the plurality of feature vectors as inputs to the feed-forward deep neural network.

14. The system of claim 10 further comprising:

an audio input device; and the controller being operatively connected to the audio input device and further configured to:

generate audio input data corresponding to speech input from a user with the audio input device; and generate the plurality of candidate speech recognition results corresponding to the audio input data using a plurality of speech recognition engines.

* * * * *